United States Patent
Aiuppa

[15] 3,676,886
[45] July 18, 1972

[54] LAWN SWEEPER

[72] Inventor: Francesco Aiuppa, W207 S8286 Hillendale Drive, Muskego, Wis. 53150

[22] Filed: Aug. 5, 1970

[21] Appl. No.: 61,075

[52] U.S. Cl. ..............................................15/83
[51] Int. Cl. ............................................E01h 1/04
[58] Field of Search ................15/79, 82–87, 340; 56/400.02

[56] References Cited

UNITED STATES PATENTS

| | | | |
|---|---|---|---|
| 3,112,593 | 12/1963 | Ronning | 15/83 X |
| 1,255,519 | 2/1918 | Ellis | 15/84 |
| 1,585,768 | 5/1926 | Clayton et al. | 15/83 |
| 3,034,236 | 5/1962 | Pyke | 15/82 X |

Primary Examiner—Edward L. Roberts
Attorney—Wheeler, Wheeler, House & Clemency

[57] ABSTRACT

A lawn-sweeping attachment adapted to be supported between the front and rear wheels of a small garden or lawn tractor and under the tractor body, includes a housing which rotatably supports a brush which picks up and discharges grass clippings and debris through a rearwardly located slot into an auger housing portion which contains a counter-rotating auger. The auger conveys the leaves and debris into a rearwardly and transversely extending discharge duct or chute located laterally, outwardly of the rear tractor wheel. An impeller at the end of the auger flight and within the discharge duct impells the debris outwardly of the duct into either a grass clipping debris collection bag or toward a blower assembly for remote discharge into a trailer.

5 Claims, 4 Drawing Figures

Patented July 18, 1972
3,676,886
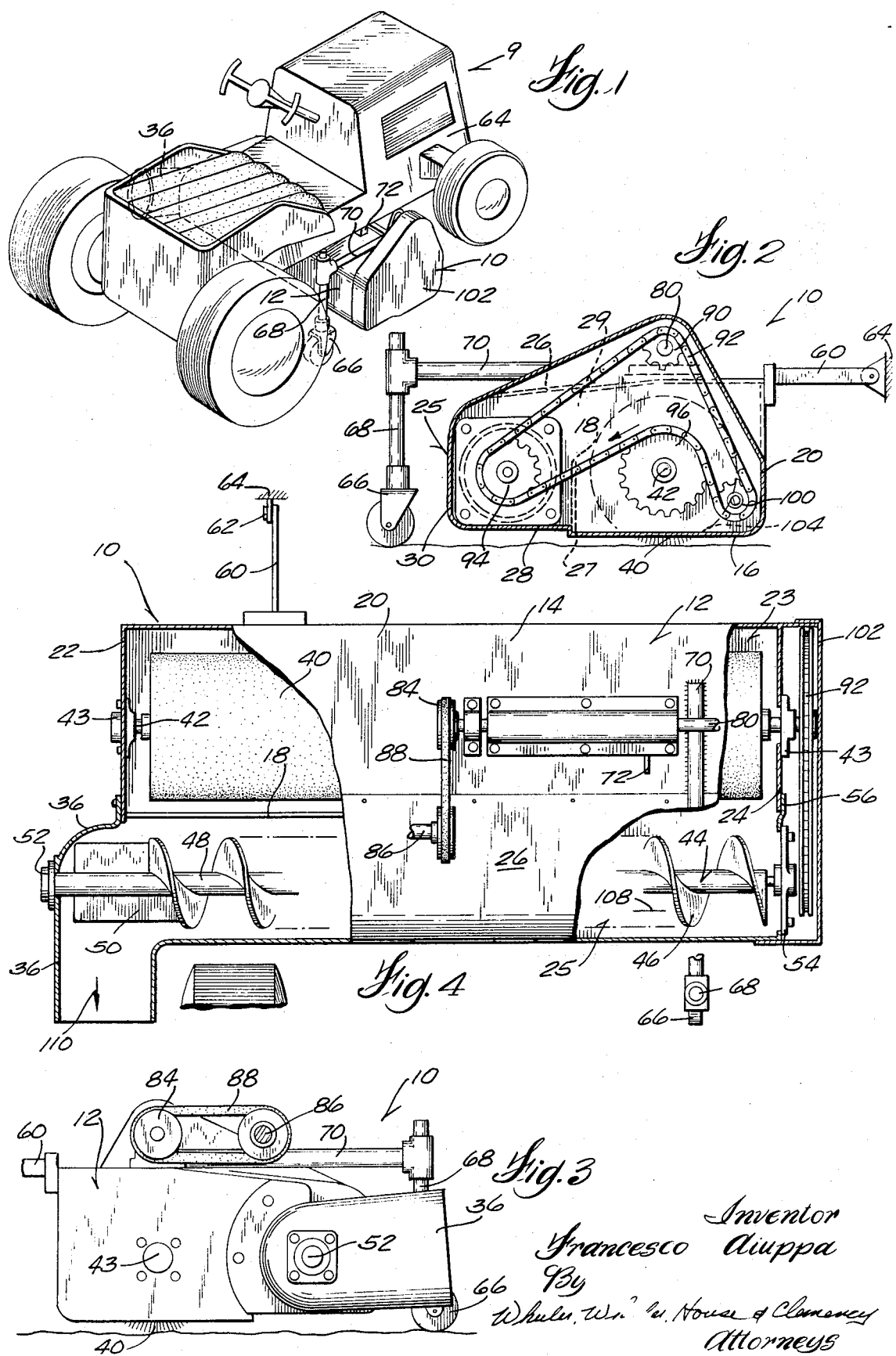
Inventor
Francesco Aiuppa
By
Wheeler, Wheeler, House & Clemency
Attorneys

LAWN SWEEPER

BACKGROUND OF INVENTION

The invention relates to attachments for garden tractors and more particularily to a sweeper attachment for a small garden tractor.

The lawn sweepers typically used with small lawn and garden tractors to pick up grass clippings, debris, and leaves are either trailed behind the tractor or mounted laterally of the tractor. With either arrangement, the maneuverability of the tractor is limited, thus, making these sweepers impractical for small lawns. Furthermore, the trailed sweeper commonly has an upwardly open receptacle located rearwardly of the sweeper brush to catch the debris. These receptacles are awkward to unload and detach. Other sweepers use a blower assembly to create a vacuum in a discharge duct connected to the sweeper housing as shown in U.S. Pat. No. 3,184,777. The later arrangement also employs a trailer to receive the debris. The blower assembly and trailer are impractical for small lawns because of the limited debris storage capacity required.

SUMMARY OF INVENTION

The invention provides a sweeper attachment adapted to be mounted between the front and rear wheels and under the tractor body of a small garden tractor. The sweeper includes a rotating brush supported in a housing which discharges the grass clippings and debris through a rearwardly located slot in the housing into an auger housing portion. An auger conveys the debris to a discharge duct which is located laterally outwardly of the rear tractor wheel. An impeller at the end of the auger flight impells the debris through the discharge duct into a grass clipping and debris collection bag or into a duct connected to a blower assembly for remote discharge into a trailer. For small lawns, the collection bag has an adequate capacity and a blower assembly and trailer are not employed.

The auger and brush are commonly driven by a single chain which engages sprockets on the ends of the brush shaft and auger shaft. The chain is driven by an intermediate shaft which is supported on the top of the housing and which is connected to the tractor power take-off shaft. The driving chain is enclosed by a housing located opposite the discharge duct and laterally outwardly of the tractor body.

It is an object of the invention to provide a sweeper attachment for a small tractor which is adapted to be mounted beneath the tractor body and between the front and rear wheels, and which includes a rotating brush and a counter rotating auger with an impeller to afford the optional use of either of two collection modes.

Further objects and advantages of the invention will become apparent from the following disclosure.

DRAWINGS

FIG. 1 is a perspective view of a tractor embodying the lawn sweeper of the invention.

FIG. 2 is an enlarged end view with portions removed of the lawn sweeper shown in FIG. 1.

FIG. 3 is a view of the end of the sweeper opposite the view shown in FIG. 2.

FIG. 4 is a plan view with portions removed and in fragmentary section of the lawn sweeper shown in FIG. 1.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structures.

In the drawings, FIG. 1 discloses a tractor 9 and a lawn sweeper attachment in accordance with the invention which is generally designated 10 and which includes a housing 12 having a top wall 14, a spaced bottom wall 16, a rear wall 18, a forward wall 20, and end walls 22 and 24 which together define a brush housing portion 23. The housing 12 also includes a generally U-shaped auger housing portion 25 with a top wall 26, bottom wall 28 and rear wall 30. The auger housing portion 25 is separated from the brush housing portion 23 by a partition 27 which extends upwardly from the bottom wall 16 and terminates at a point spaced from the top wall 14 to provide a brush housing outlet 29. One end of the auger housing portion 25 is provided with a discharge duct 36 which is located laterally outwardly of the rear tractor wheel and extends transversely to the auger housing portion 23.

The lawn sweeper includes a brush 40 which has a shaft 42 rotatably supported by bearings 43 in the end walls 22 and 24. The brush 40 can include a series of spaced bristle clumps. An auger 44 is provided with a flight 46 arranged around an auger shaft 48. The flight 46 terminates adjacent the discharge duct 36 and merges with an impeller 50 which is adapted to impel the debris rearwardly through the discharge duct 36. The auger shaft 48 is rotatably supported by a bearing 52 located on the outer wall of the discharge duct 36 and a bearing 54 which is secured to a removable bracket 56 which is connected to the end wall 24 and the auger housing portion 23. The bearing 54 is removable for disassembly of the auger 44 from the auger housing 25 for cleaning.

Means are provided for mounting the housing beneath the tractor body and between the front and rear wheels. As disclosed, the means includes a pair of spaced support arms 60 which extend forwardly from the sweeper housing and are connectable to accessory mounting straps 62 on the tractor frame or body 64. The means also includes a pair of wheels 66 supported on vertical posts 68 which are connected to horizontal posts 70 which are welded or otherwise secured to the top wall 14 of the housing.

In accordance with the invention, drive means are provided for connection to the power take-off shaft of the tractor for rotating the brush and the auger. In the disclosed construction, the means includes an intermediate shaft 80 supported by bearings 82 on the top wall 14 of the housing. The intermediate shaft is provided with a pulley 84 which is connected to the power take-off shaft 86 of the tractor by a belt 88. The other end of the intermediate shaft 80 is provided with a sprocket 90 which drives an endless chain 92. The endless chain 92 is arranged around the sprocket 92, a sprocket 96 fixed to the brush shaft 42 and an idler sprocket 100 to afford a counter-clockwise rotation of the brush, as viewed in FIG. 2. By arranging the chain 92 around the upper periphery of sprocket 96, the auger 48 and brush 40 counter-rotate. Thus, the brush picks up the debris and lifts it above the brush for discharge through the outlet 29 into the auger housing 25 and the impeller 50 swings downwardly and rearwardly to engage the debris in the bottom of the discharge duct 36 and impel it rearwardly through the duct 36.

The sprockets and chain 92 are enclosed by a housing 102 which is secured to the brush housing portion 23 and the auger housing portion 25.

The discharge duct 36 can be directly connected to an air pervious collection bag or can be connected to a duct which is connected to a blower assembly (not shown) for discharge into a trailer.

In operation of the lawn sweeper, grass clippings, debris and leaves will be engaged by the brush which is exposed through a downwardly located opening 104 in the housing. The clippings and debris will be carried upwardly and discharged rearwardly through the outlet 29 into the auger housing portion 25. The auger 44 conveys the clippings and debris to the left as shown in FIG. 4 by the arrow 108. When the clippings and debris reach the discharge duct 36, the impeller 50 impells the debris outwardly of the duct as shown by arrow 110. The location of the sweeper 10 between the wheels and beneath the tractor body affords increased maneuverability of the tractor and sweeper as compared with prior devices. The low profile of the sweeper permits the sweeper to be mounted beneath the body of most garden tractors and the alternate debris collection modes adapt the sweeper for use on large or small lawns.

Various features of the invention are set forth in the following claims.

What is claimed is:

1. In combination, a lawn sweeper and a tractor, said tractor having a body and front and rear wheels and a power take-off shaft located between said wheels and said lawn sweeper having a housing located between said front and rear wheels and between said tractor body and the ground and having a top wall and a bottom wall, said housing including a brush housing portion having a lower opening forming a debris inlet and an auger housing portion located rearwardly of said brush housing portion and separated from said brush housing portion by a partition extending upwardly from said bottom wall and spaced from said top housing wall to provide a brush housing outlet, a discharge duct communicating with said auger housing extending outwardly from one end of said auger housing and projecting outwardly of one of said rear tractor wheels, means for mounting said housing to said tractor, a brush having a shaft rotatably supported in said brush housing portion and projecting through said brush housing opening, an auger having a shaft rotatably supported in said auger housing portion, and drive means including a drive shaft rotatably supported on said top wall of said housing and connected to said power take-off shaft and means drivingly connecting said drive shaft to said brush shaft and said auger shaft for rotating said auger and for rotating said brush with the lower portion of said brush moving in a forward direction through said opening in said brush housing portion to pick up debris and deposit debris through said brush housing outlet into said auger housing portion, with said auger conveying the debris to said discharge duct.

2. A lawn sweeper in accordance with claim 1 including an impeller at the end of said auger and located in said discharge duct for impelling debris outwardly from said duct.

3. A lawn sweeper in accordance with claim 2 wherein said discharge duct projects rearwardly from said auger housing and wherein said impeller has a flat blade and said auger is rotated in a direction counter to said brush with said impeller blade swinging downwardly and rearwardly to engage debris in the bottom of the discharge duct and impel the debris rearwardly through the duct.

4. A lawn sweeper for a tractor comprising a housing having a brush housing portion having a lower opening and an auger housing portion, located rearwardly of said brush housing portion, a partition partially separating said brush housing portion from said auger housing portion and forming a brush housing portion outlet, means adapted for mounting said housing to a tractor between the front and rear wheels of the tractor and beneath the tractor, a brush having a shaft rotatably supported in said brush housing portion, an auger having a shaft rotatably supported in said auger housing portion, a discharge duct connected to one end of said auger housing and drive means adapted to be connected to the power take-off shaft of a tractor said drive means comprising an intermediate shaft rotatably supported on said housing for rotation about a horizontal axis, means for connecting said intermediate shaft to the tractor power take-off shaft, a sprocket on said auger shaft, a sprocket on said brush shaft, a sprocket on said intermediate shaft and an idler sprocket located forwardly of and below said brush sprocket and an endless chain arranged around said auger, idler and intermediate shaft sprockets and along the upper periphery of said brush sprocket to rotate said brush and counter-rotate said auger with said brush moving forwardly through said brush housing portion lower opening to pick up debris and deposit debris through said brush housing outlet into said auger housing portion, with said auger conveying the debris to said discharge duct.

5. A lawn sweeper attachment for a lawn and garden tractor comprising a first housing having a top wall, a brush housing portion with a lower opening and an auger housing portion, said auger housing portion and said brush housing portion having end walls, a partition partially separating said brush housing portion and said auger housing portion, means for detachably mounting the forward part of said housing to a tractor between the front and rear wheels of the tractor and beneath the tractor body, wheel means connected to said housing and engageable with the ground for supporting said housing above the ground, a brush having a shaft rotatably supported in said brush housing portion, an auger having a shaft rotatably supported in said auger housing portion, a discharge duct connected to one end of said auger housing and drive means including an intermediate shaft rotatably supported on said top wall of said housing and adapted to be connected to the power take-off shaft of a tractor, a drive member on said intermediate shaft, means connecting said drive member to said auger shaft and said brush shaft for rotating said auger and for rotating said brush with the lower portion of said brush moving in a forward direction through said lower opening in said brush housing portion to pick up debris and deposit debris above said partition into said auger housing portion, with said auger conveying the debris to said discharge duct, and a second housing connected to said first housing and enclosing the ends of said auger housing and located at the end of said first housing laterally outwardly of the tractor body and enclosing said intermediate shaft drive member and said means connecting said drive member to said auger shaft and said brush shaft.

* * * * *